United States Patent [19]

Asada et al.

[11] Patent Number: 5,402,305
[45] Date of Patent: Mar. 28, 1995

[54] OXIDATION-RESISTANT PALLADIUM POWDER, PRODUCTION METHOD THEREOF AND THICK-FILM CONDUCTIVE PASTE AND MULTILAYERED CERAMIC CAPACITOR PRODUCED THEREFROM

[75] Inventors: Eiichi Asada; Yuji Akimoto, both of Tokyo; Shinichi Ono; Kazurou Nagashima, both of Fukuoka; Mineto Iwasaki, Tosu; Masayuki Maekawa, Sasaguri, all of Japan

[73] Assignee: Shoei Chemical Inc., Tokyo, Japan

[21] Appl. No.: 158,509

[22] Filed: Nov. 29, 1993

[30] Foreign Application Priority Data

Nov. 30, 1992 [JP] Japan .................... 4-354339

[51] Int. Cl.⁶ ............................. H01G 1/01
[52] U.S. Cl. ..................... 361/305; 361/321.2; 252/514; 252/521; 420/463; 75/358
[58] Field of Search ............. 361/305, 321.2, 321.3; 252/574, 521; 420/463; 29/25.42; 75/358

[56] References Cited

U.S. PATENT DOCUMENTS

| | | | |
|---|---|---|---|
| 3,663,667 | 5/1972 | Cheney et al. | 75/355 |
| 3,763,409 | 10/1973 | Sheard | 361/305 |
| 3,815,187 | 6/1974 | Hanold, III | 29/25.42 |
| 4,075,681 | 2/1978 | Popowich | 361/305 |
| 4,493,789 | 1/1985 | Ueyama et al. | 252/514 |
| 5,250,358 | 10/1993 | Lombard et al. | 252/514 |

FOREIGN PATENT DOCUMENTS

| | | | |
|---|---|---|---|
| 63-31522 | 6/1988 | Japan . | |
| 0294413 | 4/1990 | Japan . | |
| 3-68484 | 10/1991 | Japan . | |
| 0443504 | 2/1992 | Japan . | |
| 6-12910 | 1/1994 | Japan | 252/514 |
| 1461176 | 1/1977 | United Kingdom . | |

Primary Examiner—Bruce A. Reynolds
Assistant Examiner—Gregory L. Mills
Attorney, Agent, or Firm—Flynn, Thiel, Boutell & Tanis

[57] ABSTRACT

An oxidation-resistant palladium powder containing one or more alkaline earth metal elements in a total amount of at least 0.005% by weight relative to Pd. The palladium powder is useful as a conductive component of a thick-film conductive paste and the resultant conductive paste can provide internal electrodes to a multilayered ceramic capacitor with minimized structural defects such as cracks or delamination. The palladium powder is produced by spraying a palladium salt solution containing one or more alkaline earth metal elements to form droplets and heating the droplets to a temperature of at least 1000° C. The preferred amount of the alkaline earth metal elements in the Pd powder is from 0.005 to 0.1% by weight relative to Pd and the preferred alkaline earth metal elements are one or more elements selected from the group consisting of Mg, Ca, Sr and Ba.

8 Claims, No Drawings

OXIDATION-RESISTANT PALLADIUM POWDER, PRODUCTION METHOD THEREOF AND THICK-FILM CONDUCTIVE PASTE AND MULTILAYERED CERAMIC CAPACITOR PRODUCED THEREFROM

BACKGROUND OF THE INVENTION

1. Field of the Invention

The present invention relates to a novel palladium (Pd) powder, and, more particularly, to a novel Pd powder which contains alkaline earth metal elements in specific amounts and is useful as a conductive component for thick-film conductive pastes. The present invention further relates to a thick-film conductive paste prepared from such a Pd powder and a multilayered ceramic capacitor having internal electrodes therein which are formed from the conductive paste. The present invention also relates to a production process of the foregoing Pd powder containing alkaline earth metal elements in specific amounts.

2. Description of the Prior Art

A multilayered ceramic capacitor has heretofore been produced by printing a thick-film conductive paste onto ceramic green sheets to form internal electrode patterns thereon, laminating the resultant sheets and firing the laminated sheets. Pd powder has extensively been used in the conductive paste, since the internal electrode patterns formed from the conductive paste are subjected to firing at a temperature as high as 1000° C. or above. However, usually, Pd powder begins to oxidise and expand at about 500° C., which is lower than the sintering temperature of ordinary ceramics, reaches its maximum oxidation rate at about 800° C. and, thereafter, is rapidly reduced to return to the original Pd at 850° C. In particular, fine Pd powder has a high oxidation activity and oxidizes almost completely to cause an increase in its weight by about 15%. Since the ceramic material is poor in strength due to insufficient sintering at a temperature as low as 600° to 700° C., the oxidation and reduction of the internal electrodes have readily caused such structural defects as cracks and delamination.

Various attempts have been made to prevent the generation of such structural defects by the regulation of the particle size of the metallic powder, oxidation treatment or surface treatment of the powder, compounding of additives, and the like. However, an urgent requirement in recent years for size reduction and capacitance enhancement of capacitors has resulted in decreases in the thickness of the ceramic layer and the internal electrode film and in the areas thereof and an increase in the number of laminated layers, thus making it difficult to improve the above-mentioned defects, especially the cracks, by conventional methods.

SUMMARY OF THE INVENTION

Accordingly, an object of the present invention is to prevent expansion due to the oxidation of internal electrodes in multilayered ceramic capacitors by suppressing the maximum oxidation rate of Pd powder to 80% or less, preferably 60% or less during firing and thereby prevent the generation of delamination and cracks in the ceramic capacitors.

In accordance with one aspect of the present invention, there is provided an oxidation-resistant palladium powder containing one or more alkaline earth metal elements in a total amount of at least 0.005% by weight relative to Pd. In the preferred embodiment, the alkaline earth metal elements are incorporated in a total amount of 0.005 to 0.1% by weight relative to Pd and the alkaline earth metal elements are one or more elements selected from the group consisting of Mg, Ca, Sr and Ba.

In accordance with another aspect, the present invention provides a thick-film conductive paste comprising the aforestated palladium powder as a conductive component and vehicle. The conductive paste is very useful in forming internal electrodes for a multilayered ceramic capacitor.

Therefore, a further aspect of the present invention provides a multilayered ceramic capacitor having internal conductors formed using the aforesaid thick-film conductive paste in which the thick-film conductive paste is printed onto ceramic green sheets to form internal electrode patterns thereon and the printed sheets are laminated and fired.

The present invention also provides a method for producing the aforesaid palladium powder, the method comprising spraying a palladium salt solution containing one or more alkaline earth metal elements to form droplets and heating the droplets to a temperature of at least 1000° C. In this production method, the alkaline earth metal elements should be added to the palladium salt solution in such amounts that the alkaline earth metal elements may be incorporated in the above-prescribed total amount of at least 0.005% by weight with respect to the weight of Pd in the resultant Pd powder.

Throughout the specification, unless otherwise specified, all percentages of the alkaline earth metal elements are expressed in weight percentages relative to Pd, i.e., in weight proportions with respect to the weight of Pd.

DETAILED DESCRIPTION OF THE PREFERRED EMBODIMENTS

The Pd powder of the present invention includes one or more alkaline earth metal elements in the state of metals or their oxides in a total amount of at least 0.005% by weight. When the alkaline earth metal elements are present as oxides in the Pd powder, the total amount is expressed in terms of metals.

As will be noted from comparative examples shown hereinafter, customarily used pure Pd powders sometimes include alkaline earth metal elements as impurities at levels as low as about 0.0008% by weight (8 ppm) and, as set forth above, undergo a considerable volume expansion.

The Pd powder of the present invention contains alkaline earth metal elements in a total amount of at least 0.005% by weight and is an entirely novel powder. The Pd powder of the present invention has a high oxidation resistance and can form a conductive film by sintering with minimized expansion due to oxidation.

Although the exact reason why the maximum oxidation rate is greatly reduced due to the inclusion of alkaline earth metal elements in the total amount of at least 0.005% by weight as metal is uncertain, it is believed that the crystal structure of the Pd powder or the structure of a palladium oxide surface formed on the Pd powder is affected by the presence of the alkaline earth metal elements.

As set forth above, when the content of alkaline earth metal elements is less than 0.005% by weight in their total, the maximum oxidation cannot be suppressed to 80% or less. Although there is no specific limitation for the maximum content of the alkaline earth metal elements, the maximum oxidation rate will not be reduced below 25%, even if the alkaline earth metal elements are present in their total amount exceeding 0.1% by weight. Further, since the main component constituting a ceramic capacitor is typically a perovskite structure compound composed of alkaline earth metal oxides and titanium oxide, excessive addition of the alkaline earth metal elements may destroy the perovskite structure during firing. Therefore, excessive addition of the alkaline earth metal elements are undesirable. Especially, in order to suppress the maximum oxidation rate to 60% or less without adversely affecting the properties of capacitors, the alkaline earth metal elements are preferably added within the range of 0.01 to 0.1% by weight in total. More preferred alkaline earth metal elements are Mg, Ca, Sr and Ba.

In the production of the Pd powder containing the alkaline earth metal elements, any known process, such as chemical reduction, atomizing, evaporation, spray pyrolysis or the like, may be used. Particularly, spray pyrolysis is preferable because this process permits alkaline earth metal elements to be reproducibly incorporated into monodispersed particles having a particle size of about 1 μm, thereby enabling the thinning of electrode films.

In the present invention, the spray pyrolysis process is carried out by adding one or more alkaline earth metal elements to a palladium salt solution and spraying the solution to form droplets using an atomizer and thermally decomposing the droplets by heating at a high temperature. The thermal decomposition is performed at a temperature of not lower than the decomposition temperature of the palladium salt and also not lower than the reduction temperature of palladium oxide and preferably at a temperature of at least 1000° C.

The palladium salt used in the present invention is not limited to particular palladium salts, so long as it can deposit Pd metal by pyrolysis. For instance, nitrate, sulfate, chloride or the like may be used.

In order to introduce the alkaline earth metal elements into the palladium salt solution, various known compounds thereof may be employed, as long as they yield the alkaline earth metal elements in the state of metals or their oxides in the above-prescribed content in the resultant Pd powder.

Now the present invention will be described with reference to examples.

EXAMPLE 1

0.89 g of calcium nitrate tetrahydrate (i.e., hydrated calcium nitrate with four molecules of water) was added to 3300 g of an aqueous palladium nitrate solution prepared by dissolving one mole palladium nitrate in one liter of water to provide a palladium salt solution containing 0.05% by weight of calcium relative to Pd. Subsequently, the thus obtained solution was sprayed into fine droplets by using a ultrasonic atomizer and the resultant droplets were passed through an electric furnace being heated at 1600° C. to obtain Pd powder having an average particle size of 0.6 μm. The Pd powder was analyzed by an ICP emission spectrometer and 0.038% by weight of Ca was detected. The weight change of the Pd powder up to 1000° C. was examined with a thermogravity analyzer and a maximum weight increase rate of 4.3% was obtained due to the oxidation of Pd at 790° C. This maximum value corresponds to a weight increase resulting from an oxidation rate of 28.6% of Pd.

EXAMPLES 2-8

Pd powders were prepared in the same manner as described in Example 1 except that the added amounts of the calcium nitrate tetrahydrate was changed to amounts of 0.005% by weight, 0.01% by weight, 0.02% by weight, 0.03% by weight, 0.075% by weight, 0.10% by weight and 0.20% by weight, calculated as Ca, relative to Pd.

Table 1 shows the amounts of Ca contained in the resultant Pd powders, the maximum weight increase rates due to oxidation and the oxidation rates of Pd corresponding to the respective maximum weight increase rates.

Example 2 showed a higher Ca content in the resultant Pd powder than the added Ca amount, as shown in Table 1, because Ca was also present as an impurity in an amount of 0.0009% by weight (9 ppm) in the pure Pd powder used as a starting material. On the other hand, Examples 3 to 8 showed a reduction in the amounts of Ca in the resultant Pd powders. In these examples, since the added Ca was not wholly incorporated into the Pd powders, the Ca amounts present in the resultant Pd powders were lower than the initially added Ca amounts.

Comparative Example 1

A comparative Pd powder was prepared in the same manner as described in Example 1 except that no Ca was added to the palladium salt solution.

Table 1 shows the amount of Ca contained in the resultant Pd powder, the maximum weight increase rate due to oxidation and oxidation rate of Pd corresponding to the maximum weight increase rate.

The amount of Ca of 0.0008% by weight shown in Table 1 indicates that Ca was contained as an impurity in an amount of 0.0008% by weight in the pure Pd powder used as a starting material, although Ca was not added to the starting Pd powder.

Comparative Example 2

Another comparative Pd powder was prepared in the same manner as described in Example 1 except that the added amount of calcium nitrate tetrahydrate was changed to 0.002% by weight, in terms of Ca, relative to Pd. As shown in Table 1, this comparative example showed very large values in its oxidation rate of Pd (87.8%) and maximum weight increase rate due to oxidation (13.2%).

Comparative Example 3

A further comparative Pd powder was prepared in the same manner as described in Example 1 except that the added amount of calcium nitrate tetrahydrate was changed to 0.004% by weight, in terms of Ca, relative to Pd. As shown in Table 1, this comparative example showed very large values in its oxidation rate of Pd (86.5%) and maximum weight increase rate due to oxidation (13.0%).

TABLE 1

| Ex. | Added Ca amount relative to Pd (wt. %) | Ca amount in Pd powder (wt. %) | Max. rate of weight increase by oxidation (%) | Oxidation rate of Pd (%) |
|---|---|---|---|---|
| Examples of the Present Invention | | | | |
| 2 | 0.005 | 0.0059 | 10.1 | 67.2 |
| 3 | 0.01 | 0.0095 | 9.0 | 59.9 |
| 4 | 0.02 | 0.0165 | 8.6 | 57.2 |
| 5 | 0.03 | 0.023 | 7.9 | 52.6 |
| 6 | 0.075 | 0.040 | 4.3 | 28.6 |
| 7 | 0.10 | 0.075 | 4.0 | 26.6 |
| 8 | 0.20 | 0.160 | 4.0 | 26.6 |
| Comparative Examples | | | | |
| 1 | 0 | 0.0008 | 13.6 | 90.5 |
| 2 | 0.002 | 0.0016 | 13.2 | 87.8 |
| 3 | 0.004 | 0.0038 | 13.0 | 86.5 |

EXAMPLES 9-18

Pd powders were prepared in the same manner as described in Example 1 except that the calcium nitrate tetrahydrate used in Example 1 was replaced with nitrates of Mg, Sr and Ba in the amounts shown in Table 2. The added amounts are indicated as metals (i.e., Mg, Sr and Ba, respectively), relative to Pd. The results are shown in Table 2.

TABLE 2

| Ex. | Added amount relative to Pd (wt. % as metal) | Amount of added element in Pd powder (wt. %) | Max. rate of weight increase by oxidation (%) | Oxidation rate of Pd (%) |
|---|---|---|---|---|
| 9 | Mg = 0.006 | 0.0055 | 11.2 | 74.5 |
| 10 | Mg = 0.05 | 0.032 | 8.6 | 57.2 |
| 11 | Sr = 0.01 | 0.008 | 11.3 | 75.1 |
| 12 | Sr = 0.03 | 0.025 | 10.7 | 71.2 |
| 13 | Sr = 0.05 | 0.039 | 8.0 | 53.9 |
| 14 | Sr = 0.075 | 0.057 | 5.4 | 35.9 |
| 15 | Ba = 0.01 | 0.0095 | 10.6 | 70.5 |
| 16 | Ba = 0.031 | 0.023 | 9.3 | 61.9 |
| 17 | Ba = 0.05 | 0.038 | 6.2 | 41.3 |
| 18 | Ba = 0.1 | 0.074 | 4.1 | 27.3 |

EXAMPLES 19-20

Pd powders were prepared in the same manner as described in Example 1 except that the calcium nitrate tetrahydrate used in Example 1 was replaced with nitrates of Ca, Sr and Ba each in amount of 0.015% by weight (Example 19) and 0.02% by weight (Example 20), calculated as each metal, relative to Pd. The results are shown in Table 3.

TABLE 3

| Ex. | Added amount of each element relative to Pd (wt. %) | Amount of each element in Pd powder (wt. %) | Max. rate of weight increase by oxidation (%) | Oxidation rate of Pd (%) |
|---|---|---|---|---|
| 19 | 0.015 | Ca = 0.013<br>Ba = 0.011<br>Sr = 0.014 | 7.5 | 57.6 |
| 20 | 0.020 | Ca = 0.018<br>Ba = 0.016<br>Sr = 0.018 | 4.1 | 27.3 |

EXAMPLE 21

Pd powder was prepared in the same manner as described in Example 1 except that the temperature of the electric furnace was changed to 1200° C. The thus obtained Pd powder had an average particle size of 0.8 μm and a Ca content of 0.035% by weight and showed a maximum oxidative weight increase rate of 6.8%, corresponding to a Pd oxidation rate of 45.2%.

EXAMPLE 22 AND COMPARATIVE EXAMPLE 100 parts by weight of each of the Pd powders obtained in Examples 1 to 21 and Comparative Examples 1 to 3 was mixed with 100 parts by weight of a vehicle consisting of ethylcellulose and solvent and the resultant mixture was made into a paste for internal electrodes of a multilayered ceramic capacitor. Viscosity measurements of the pastes using a Brookfield viscometer HBT showed that they were stable pastes having a viscosity of 50 poise±5 poise at 100 rotations.

EXAMPLE 23 AND THE COMPARATIVE EXAMPLE

Each of the pastes prepared in Example 22 and Comparative Example was printed onto ceramic green sheets comprising barium titanate as a main component, followed by drying at 150° C. Then, 60 pieces of the printed sheets were laminated and pressed. The thus laminated sheets were fired over a total firing time of 13 hours including 2 hours at a peak temperature of 1350° C. In such a manner, 30 multilayered ceramic capacitors were obtained as samples for each conductive paste.

The external appearance of these 30 samples and the sections thereof were observed to check the occurrence of cracks or delamination. The numbers of samples showing cracks or delamination are shown in Table 4.

TABLE 4

| Pd Powder | Crack | Delamination |
|---|---|---|
| Example 1 | 0 | 0 |
| Example 2 | 1 | 2 |
| Example 3 | 0 | 0 |
| Example 4 | 0 | 0 |
| Example 5 | 0 | 0 |
| Example 6 | 0 | 0 |
| Example 7 | 0 | 0 |
| Example 8 | 0 | 0 |
| Example 9 | 2 | 1 |
| Example 10 | 0 | 0 |
| Example 11 | 1 | 1 |
| Example 12 | 0 | 1 |
| Example 13 | 0 | 0 |
| Example 14 | 0 | 0 |
| Example 15 | 1 | 1 |
| Example 16 | 0 | 1 |
| Example 18 | 0 | 0 |
| Example 19 | 0 | 0 |
| Example 20 | 0 | 0 |
| Example 21 | 0 | 0 |
| Comparative Example 1 | 30 | 28 |
| Comparative Example 2 | 30 | 29 |
| Comparative Example 3 | 22 | 21 |

As will be seen from Table 4, cracking or delamination occurred when the comparative Pd powders with alkaline earth metal contents of 0.0008% by weight (Comparative Example 1), 0.0016% by weight (Comparative Example 2) and 0.0038% by weight (Comparative Example 3) were used. In contrast to this, it is clear that the occurrence of cracking or delamination can be prevented or minimized by incorporating the alkaline earth metal elements in amounts of at least 0.005% by weight into Pd powder and remarkably superior effects can be obtained.

As is evident from the foregoing Examples, the use of the inventive Pd powder containing alkaline earth metal elements in a total content of at least 0.005% by weight can provide multilayered ceramic capacitors with minimized structural defects such as cracks or delamination. Further, by employing a spray pyrolysis process at a heating temperature of 1000° C. or higher, there can be obtained monodispersed fine spherical particles which make it possible to form much thinner dense electrode films. Therefore, it is possible to produce highly multilayered capacitors with their size reduced and capacitance enhanced.

What is claimed is:

1. An oxidation-resistant palladium powder containing at least one alkaline earth metal element incorporated therein in a total amount of from 0.005 to 0.1% by weight relative to Pd.

2. An oxidation-resistant palladium powder according to claim 1, wherein the alkaline earth metal element is at least one element selected from the group consisting of Mg, Ca, Sr and Ba.

3. A thick-film conductive paste comprising palladium powder as a conductive component and a vehicle, said palladium powder containing at least one alkaline earth metal element incorporated therein in a total amount of 0.005 to 0.1% by weight relative to Pd.

4. A thick-film conductive paste according to claim 3, wherein the alkaline earth metal element is at least one element selected from the group consisting of Mg, Ca, Sr and Ba.

5. A multilayered ceramic capacitor produced by printing a thick-film paste onto ceramic green sheets to form internal electrode patterns thereon, laminating the printed sheets, and firing the laminated sheets, in which the thick-film conductive paste comprises palladium powder as a conductive component and a vehicle, said palladium powder containing at least one alkaline earth metal element incorporated therein in a total amount of from 0.005 to 0.1% by weight relative to Pd.

6. A multilayered ceramic capacitor according to claim 5, wherein the alkaline earth metal element is at least one element selected from the group consisting of Mg, Ca, Sr and Ba.

7. A method for producing an oxidation-resistant palladium powder, the method comprising spraying a palladium salt solution containing at least one alkaline earth metal element incorporated therein in such amounts that the alkaline earth metal element is incorporated in a total amount of 0.005 to 0.1% by weight relative to the weight of Pd in the resultant Pd powder to form droplets and heating the droplets to a temperature of at least 1000° C.

8. A method according to claim 7, wherein the alkaline earth metal element is at least one element selected from the group consisting of Mg, Ca, Sr and Ba.

* * * * *